United States Patent [19]

Yoshida et al.

[11] 4,190,944
[45] Mar. 4, 1980

[54] METHOD OF MANUFACTURING SLIDE FASTENERS

[75] Inventors: Hiroshi Yoshida, Uozu; Shunji Akashi, Kurobe, both of Japan

[73] Assignee: Yoshida Kogyo K.K., Tokyo, Japan

[21] Appl. No.: 916,735

[22] Filed: Jun. 19, 1978

[30] Foreign Application Priority Data

Jun. 30, 1977 [JP] Japan ............... 52/78277

[51] Int. Cl.² ............................................ B23P 11/00
[52] U.S. Cl. ................................. 29/408; 29/33.2
[58] Field of Search ............ 29/33.2, 408, 409, 410, 29/766, 767, 768, 769

[56] References Cited

U.S. PATENT DOCUMENTS

| | | | |
|---|---|---|---|
| 2,219,165 | 10/1940 | Nedal | 29/408 |
| 3,190,779 | 6/1965 | Porepp | 29/408 X |
| 3,340,594 | 9/1967 | Frohlich et al. | 29/408 |
| 3,485,691 | 12/1969 | Waldes | 29/408 X |
| 4,074,413 | 2/1978 | Taccani | 29/408 |
| 4,110,890 | 9/1978 | Akashi | 29/408 |

*Primary Examiner*—Ervin M. Combs
*Attorney, Agent, or Firm*—Bucknam and Archer

[57] ABSTRACT

A pair of continuous slide fastener stringers having a pair of stringer tapes including thermoplastic synthetic fibers and a pair of interengaged rows of fastener elements mounted on the confronting edges of the stringer tapes are provided with an element-free gap therein and are cut off transversely of the element-free gap to produce an individual slide fastener length at a first station with ultrasonic processing means. Simultaneously, the cut edges and ends are fused and a top end stop is mounted on the slide fastener length with heat induced by the ultrasonic processing means. While advancing from the first station, the element rows are separated and introduced into a slider through its throats which is supported on a slider holder. Upon arrival at a second station of the fastener stringers with the elements rows emerging from the slider mouth interengated, a bottom end stop is mounted on the fastener stringers across the coupled rows of fastener elements.

2 Claims, 7 Drawing Figures

METHOD OF MANUFACTURING SLIDE FASTENERS

BACKGROUND OF THE INVENTION

1. Field of the Invention

The present invention relates to a method of manufacturing individual slide fasteners from a pair of slide fastener stringers of continuous or substantially endless length.

2. Prior Art

As is well known in the art, slide fastener parts are assembled into individual slide fasteners through a number of distinct processing steps. A pair of rows of fastener elements are mounted respectively onto the confronting edges of a pair of slide fastener tapes, and the rows of fastener elements are interengaged or coupled together into a slide fastener chain. Then, element-free spaces or gaps are formed in the slide fastener stringers at predetermined intervals therealong, and the fastener stringers are severed thereacross centrally of the element-free gaps, followed by installation of a slider onto the slide fastener chain from the cut end of the stringers. Top and bottom end stops are finally attached to the fastener stringers to trap the slider thereon, thereby producing a slide fastener. Some of the steps involve additional processes to eliminate various inconveniences which could be developed in association with such steps. For example, the fastener elements located adjacent to the element-free gap should be fixed in place against loosening and the tape fabric at the cut edges should be free from raveling, both for neat finishing and smooth slider installation. Further, since the slide fastener chain normally passes through the slider from its mouth, the element rows become uncoupled when they emerge from the throats of the slider, and hence it is difficult to attach the top end stop halves to the separated stringers in exact alignment with each other. Upon mounting of the top end stop, the slider is required to be moved up to the attached top end stop for intermeshing the element rows again.

Therefore, there have been required many independent processing machines, which jointly make it difficult to keep a high degree of quality control, and are liable to produce off-specification products due to finishing errors built up by such many machines. In addition, with prior machine arrangements, the rate of production is relatively low and the finished products become expensive.

SUMMARY OF THE INVENTION

According to the present invention, a pair of blank slide fastener stringers having a pair of stringer tapes including thermoplastic synthetic fibers are provided with an element-free gap and at the same time are severed to produce a unit slide fastener length at a first station with ultrasonic processing means. Simultaneously, the edges of the element-free gap and the cut ends of the fastener stringers and of the slide fastener length are fused, and a top end stop is formed on the cut end portion of the unit slide fastener length at the first station with the ultrasonic processing means. The fastener stringers are thereafter separated apart from each other to uncouple the rows of fastener elements, and the uncoupled element rows are introduced into a slider respectively through a pair of throats thereof while the stringers are being advanced from the first station to a downstream second station, where a bottom end stop is mounted on the element rows that have been intermeshed again after emerging from the mouth of the slider.

An object of the present invention is to provide a method of manufacturing slide fasteners which comprises centralized processing steps that can be carried out at one time.

Another object of the present invention is to provide a method of manufacturing slide fasteners which is relatively simple and can be effected on a single apparatus.

Still another object of the present invention is to provide a method of manufacturing slide fasteners of a good quality less costly and at a high rate of production.

The above and other objects, features and advantages of the present invention will become apparent from the following description when taken in conjunction with the accompanying drawings.

DETAILED DESCRIPTION

Figure 1:
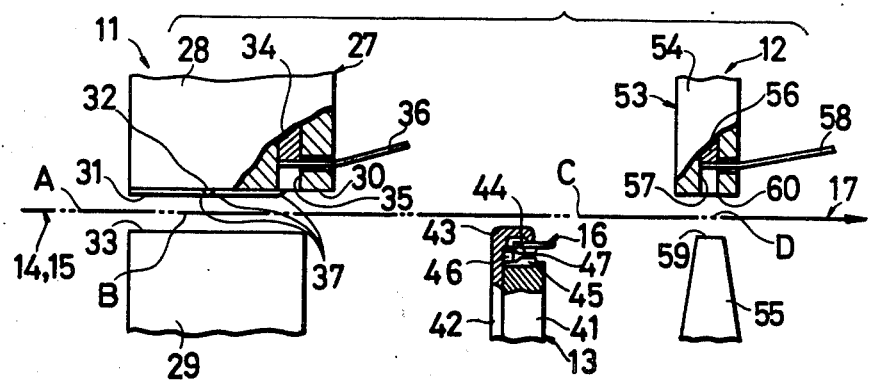
FIG. 1 is a schematic elevational view of an apparatus for reducing to practice a method of manufacturing slide fasteners in accordance with the present invention.

A method according to the present invention is carried out by an apparatus schematically shown in FIG. 1 and generally indicated by the numeral 10. The apparatus 10 basically comprises a first station 11, a second station 12 located downstream of the first station 11, and a slider holder 13 disposed between the first and second stations 11, 12. As a pair of blank slide fastener stringers 14, 15 (better shown in FIG. 2) are fed through the apparatus 10, they are processed at the first station 11, are equipped with a slider 16 supplied from the slider holder 13, and finally are processed at the second station 12, thereby producing an individual slide fastener 17 (better shown in FIG. 6).

Figure 2:
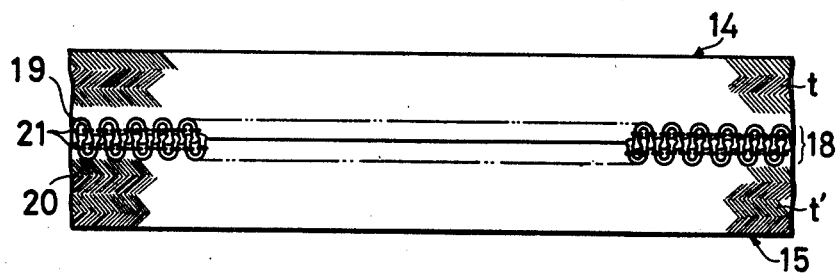
FIG. 2 is an enlarged fragmentary plan view of a pair of blank slide fastener stringers.

FIGS. 2, 3, 4 and 5 illustrate the fastener stringers 14, 15 respectively at the positions A, B, C and D in FIG. 1 while they are being progressively processed into the slide fastener 17. As shown in FIG. 2, the fastener stringers 14, 15 comprise a pair of woven or knitted stringer tapes t, t' made up of thermoplastic synthetic fibers or their blended yarn, and a fastener chain 18 composed of a pair of interengaged rows of fastener elements 19, 20 made of thermoplastic synthetic resin, the rows of fastener elements 19, 20 being sewn with threads 21 including thermoplastic synthetic fibers to the confronting longitudinal edges of the stringer tapes t, t'. Although the fastener elements 19, 20 are shown as being of the meandering or zigzag type, they may be of the helically coiled type. The slide fastener stringers 14, 15 may be manufactured in the conventional manner. More specifically, the pair of stringer tapes t, t' are kept parallel to each other and are advanced longitudinally in one direction, and the pair of intermeshed rows of fastener elements 19, 20 are sewn successively onto the confronting edges of the stringer tapes t, t'. The slide fastener stringers 14, 15 thus formed are fed intermittently into the first station 11 for a distance corresponding to a desired unit fastener length.

Figure 3:
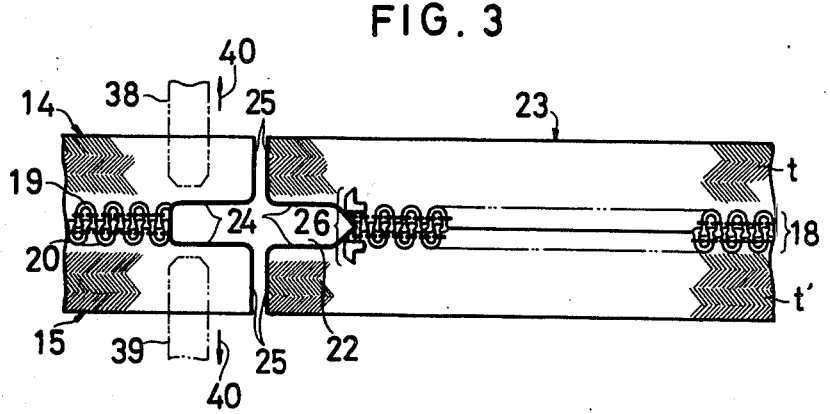
FIGS. 3 through 5 are enlarged plan views respectively showing the fastener stringers progressively processed in accordance with the invention.

The first station 11 centralizes and performs four processing steps simultaniously. In FIG. 3, such concurrent steps comprise producing an element-free gap or space 22 of a substantially rectangular configuration on the fastener stringers 14, 15, cutting off the fastener stringers 14, 15 substantially centrally across the element-free gap 22 thereby providing an individual slide fastener length 23, fusing the edges 24 of the element-free gap 22 and the cut ends 25 of the fastener stringers 14, 15 and of the slide fastener length 23, and forming a top end stop 26 on the cut end portion of the individual slide fastener length 23. To accomplish such steps, the first station 11 includes an ultrasonic processing device 27 generally comprising a fixed anvil 28 and a horn 29 vertically movable toward and away from the fixed anvil 28 as shown in FIG. 1. The anvil 28 has a lower surface 30 facing the horn 29, the lower surface 30 having thereon a looped ridge 31 that corresponds in contour to the element-free gap 22 and a linear ridge 32 extending across and centrally of the looped ridge 31 in a direction that extends substantially transversely to the direction in which the fastener stringers 14, 15 travel. The horn 29 has a flat upper surface 33 for coacting with the ridges 31, 32 on the anvil 28 to produce the element-free gap 22 and to cut off the fastener stringer 14, 15. The anvil 28 contains a punch 34 disposed at the downstream end of the looped ridge 31, the punch 34 being vertically reciprocable in a slot 35 for severing a narrow web 36 of thermoplastic synthetic resin and then for forcing the severed piece downwardly through the slot 35 toward the lower surface 30 of the anvil 28 for forming the top end stop 26.

In operation, the horn 29 is raised toward the anvil 28 while the fastener stringers 14, 15 are stopped between intermittent movements thereof. When the upper surface 33 of the horn 29 is held against the ridges 31, 32 on the anvil 28 with the fastener stringers 14, 15 interposed in between, the horn 29 is energized to generate ultrasonic vibration, which enables the upper surface 33 to cooperate with the ridges 31, 32 in momentarily abrading those portions of the stringers 14, 15 which are in contact with the ridges 31, 32. The fastener stringers 14, 15 thus are provided with the element-free gap 22 and are cut off as shown in FIG. 3. At the same time, the thermoplastic synthetic resin material at the edges 24 bounding the element-free gap 22 and at the cut ends 25 of the fastener stringers 14, 15 and of the slide fastener length 23 is fused in contact with the surfaces 37 of the ridges 31, 32 with heat developed by the ultrasonic vibration of the horn 29, the fused synthetic resin material being solidified to prevent fraying of the tape fabric yarn at such cut edges 24 and ends 25. The cut ends of the fastener elements 19, 20 located adjacent to the element-free gap 22 are also fused with the tape fabric against sticking up from the stringer tapes t, t'. Simultaneously with the formation of the element-free gap 22 and the cutting off of the stringers 14, 15, the piece severed from the narrow web 36 is lowered by the punch 34 until such piece is applied against the slide fastener length 23 near the element-free gap 22. The piece is formed into the top end stop 26 and is fused to the cut end portion of the slide fastener length 23 with heat ultrasonically induced by the horn 29, thereby mounting the top end stop 26 on the slide fastener length 23 as illustrated in FIG. 3. The top end stop 26 is composed of a pair of halves mounted respectively on the stringer tapes t, t' in transverse alignment with each other. With the rows of elements 19, 20 coupled together, attachment of the halves of the top end stop 26 in correct alignment is much easier than would be with the element rows separated from each other.

Then, the slide fastener length 23 is advanced by a grip which will be described later on, and at the same time the fastener stringers 14, 15 are also advanced by a pair of grips 38, 39 (FIGS. 3 and 4) from the first station 11 to the second station 12. Each grip 38, 39 grasps the cut end portion of one of the stringer tapes t, t' adjacent to the end of the elements rows 19, 20. At an initial portion of the stroke toward the second station 12, the grips 38, 39 are moved apart from each other as indicated by the arrows 40 in FIG. 3 to cause some of the intermeshed elements 19, 20 near the element-free gap 22 to become uncoupled for introduction into the slider 16 (FIGS. 1 and 4) carried on the slider holder 13. As shown in FIG. 1, the slider holder 13 includes a base 41 that is vertically or angularly movable, and a support 42 having a hook 43 for holding the slider 16 in place on the base 41, the hook 43 being movable toward and away from the base 41 for clamping and releasing of the slider 16.

Figure 4:
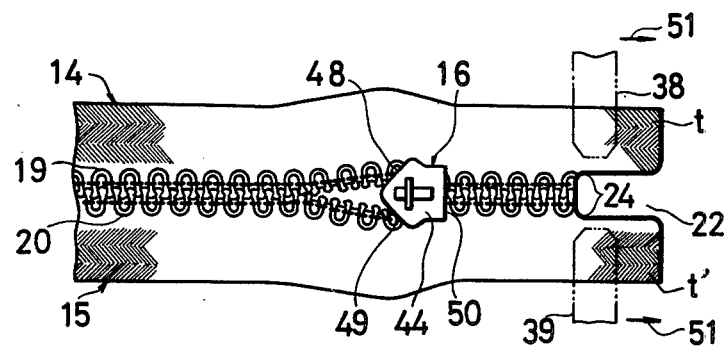

The slider 16 has a pair of upper and lower wings or shields 44, 45 interconnected by a neck or separator diamond 46, the upper and lower wings 44, 45 and the neck 46 jointly providing a Y-shaped guide channel 47 for the passage therethrough of the rows of fastener elements 19, 20. The guide channel 47 has at one end a pair of throats 48, 49 where the element rows 19, 20 enter or emerge from the guide channel 48 in the uncoupled state, and has at the other end a mouth 50 where the element rows 19, 20 enter or emerge from the guide channel 47 in the coupled state (FIG. 4). The slider 16 is supported on the slider holder 13 with the throats 48, 49 directed toward the first station 11.

When the fastener stringers 14, 15 are moved forwardly by the grips 38, 39 in the direction of the arrows 51 in FIG. 4, the separated rows of fastener elements 19, 20 are introduced into the slider guide channel 47 respectively through the throats 48, 49 thereof. The introduction of the element rows 19, 20 into the slider throats 48, 49 is smooth because the cut ends of the fastener elements adjacent to the element-free gap 22 are fused and thus positionally stabilized. As the grips 38, 39 travel past the slider 16, they are moved closer to each other whereupon the element rows 19, 20 become interengaged again as they go out of the mouth 50 of the slider 16 (FIG. 4). On the movement toward the slider 16, the coupled rows of fastener elements 19, 20 are progressively disengaged from each other by the slider neck 46 at a position just before the slider 16. Such manner of introducing or threading a slide fastener chain into a slider is called "reverse threading", because the fastener chain is normally inserted into the slider guide channel from the mouth and then becomes separated by the neck into a pair of uncoupled element rows, in which case the installed slider must be pulled back are along in order to couple the element rows again. The "reverse threading" procedure is advantageous is that where a slider to be installed is of the automatic locking type, there is no need to raise the locking prong out of the guide channel during threading of the element rows therethrough.

Upon arrival of the cut end portion of the fastener stringers 14, 15 at the second station 12, the advancing movement of the grips 38, 39 is arrested for applying a bottom end stop 52 (FIG. 5) to the fastener stringers 14, 15. As shown in FIG. 1, the second station 12 comprises an ultrasonic processing device 53 including a fixed anvil 54 and a horn 55 vertically movable toward and away from the fixed anvil 54. The anvil 54 contains a punch 56 vertically reciprocable in a slot 57 for severing a narrow web 58 of thermoplastic synthetic resin and for forcing the cut piece downwardly. When the fastener stringers 14, 15 are at rest with extreme elements near the element-free gap 22 held in registry with the slot 57 in the anvil 54, the horn 55 is raised until its upper surface 59 presses the fastener stringers 14, 15 against the lower surface 60 of the anvil 54. At the same time, the punch 56 is lowered to cut off the narrow web 58 and to apply the severed piece against and astride the extreme elements on the fastener stringers 14, 15. The horn 55 is actuated to produce ultrasonically induced heat that causes the applied piece to be shaped into the bottom end stop 52 and simultaneously to be welded to the fastener stringers 14, 15 (FIG. 5).

As an alternative, the bottom end stop 52 may be made of metal, in which case it can be mounted in place by curling or staking.

Figure 5:
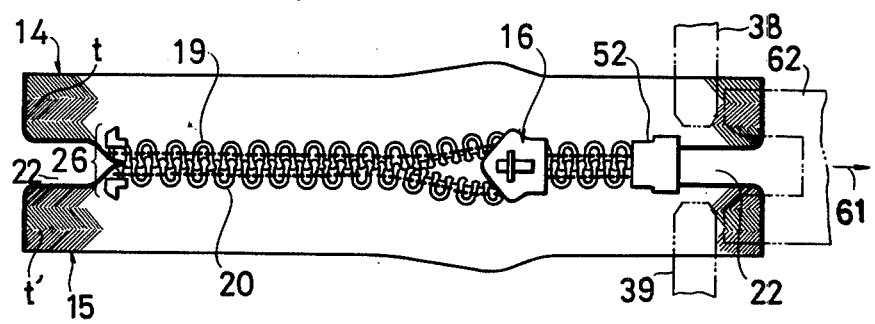
Figure 6:
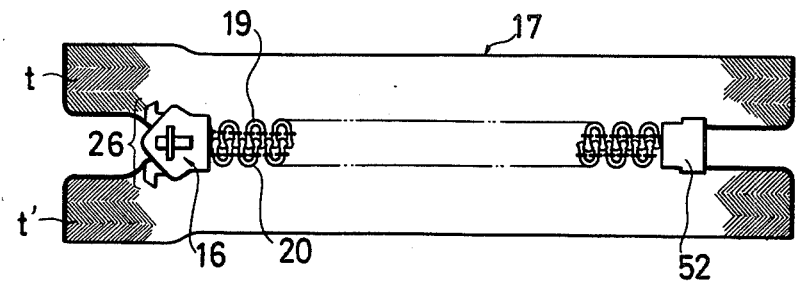
FIG. 6 is an enlarged plan view of a slide fastener that has been completed.

Simultaneously with the mounting of the bottom end stop 52 at the second station 12, the ultrasonic processing device 27 at the first station 11 is also energized, thereby producing the slide fastener 17 as shown in FIG. 5. The slide fastener 17 thus completed is longitudinally advanced in the direction of the arrow 61 by a grip 62 (FIG. 5) for discharging out of the apparatus 10. After the fastener stringers 14, 15 are moved until the slider 16 reaches the installed top end stop 26, the slider 16 is released of locked engagement with the slider holder 13, whereupon the slide fastener 17 as illustrated in FIG. 6 is discharged with the rows of fastener elements 19, 20 fully intermeshed.

Figure 7:
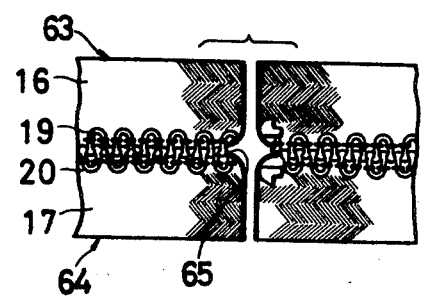
FIG. 7 is an enlarged fragmentary plan view showing a pair of differently processed slide fastener stringers.

FIG. 7 shows a pair of slide fastener stringers 63, 64 having a substantially lozenge-shaped element-free gap 65 formed therein at the first station.

With this arrangement, since the various processing steps are carried out on the fastener stringers simultaneously at two stations and during intermittent movement of the fastener stringers between the two stations, the overall manufacturing procedure can be greatly simplified and speeded up, and can be performed on a single apparatus.

Although the preferred embodiment of the present invention has been shown and described, it should be understood that various changes and modifications may be made without departing from the scope of the appended claims.

We claim:

1. A method of manufacturing individual slide fasteners from a pair of continuous slide fastener stringers having a pair of stringer tapes including thermoplastic synthetic fibers and a pair of interengaged rows of fastener elements made of thermoplastic synthetic resin and mounted on and along the confronting edges, respectively, of the stringer tapes, comprising the steps of:

(a) feeding said fastener stringers intermittently for a distance corresponding to a desired fastener length;
    (b) producing an element-free gap in said fastener stringers at a first station by cutting with ultrasonic processing means while said stringers are at rest between intermittent movements;
    (c) simultaneously with the gap producing step, cutting off said element-free gap at said first station with said ultrasonic processing means, thereby providing an individual slide fastener length;
    (d) simultaneously with the gap producing step and the stringers cutting step, fusing the edges of the element-free gap and the cut ends of the fastener stringers and of the slide fastener length at said first station with said ultrasonic processing means;
    (e) simultaneously with the gap producing step, forming a top end stop on the cut end portion of said individual slide fastener length at said first station with said ultrasonic processing means;
    (f) thereafter, at an intermediate location between said first station and a second station, separating the fastener stringers of said individual slide fastener length apart from each other along a limited length portion of said stringers so as to disengage the rows of fastener elements at said intermediate location to permit the introduction of said disengaged rows of fastener elements into a slider;
    (g) at said intermediate location introducing said disengaged rows of fastener elements into a slider respectively through a pair of throats thereof while said individual slide fastener length stringers are being advanced from said first station toward said second station;
    (h) reengaging, by the action of said slider, the disengaged rows of fastener elements while said individual slide fastener length stringers are being advanced from said first station to said second station; and
    (i) thereafter, mounting a bottom end stop on the rows of fastener elements that have been interengaged again after issuing from the mouth of said slider, at the cut end portion of said individual slide fastener length stringers while the latter are at rest at said second station.

2. A method according to claim 1, said bottom end stop being formed by ultrasonic processing means at said second station.